United States Patent [19]

Cooper

[11] 3,851,141
[45] Nov. 26, 1974

[54] WORK PIECE HEATING AND WELDING CONTROL SYSTEM

[75] Inventor: Peter J. Cooper, Newport Beach, Calif.

[73] Assignee: Cooperheat, Mountain View, Calif.

[22] Filed: Apr. 27, 1973

[21] Appl. No.: 355,185

[52] U.S. Cl. .............................................. 219/132
[51] Int. Cl. .................................... B23k 9/10
[58] Field of Search..... 219/131 R, 131 WR, 131 F, 219/132, 301

[56] References Cited
UNITED STATES PATENTS

| | | | |
|---|---|---|---|
| 3,059,164 | 10/1962 | Johnson | 219/131 R X |
| 3,177,338 | 4/1965 | Hoffmann | 219/131 R |
| 3,253,118 | 5/1966 | Frederick | 219/131 R |
| 3,278,721 | 11/1966 | Roe | 219/131 R |
| 3,324,379 | 6/1967 | Mulder | 219/131 R |
| 3,475,585 | 10/1969 | Pierce | 219/131 R |
| 3,482,080 | 12/1969 | Kassen | 219/301 X |
| 3,584,185 | 6/1971 | Mann et al. | 219/131 F |

*Primary Examiner*—J. V. Truhe
*Assistant Examiner*—Clifford C. Shaw
*Attorney, Agent, or Firm*—Flehr, Hohbach, Test, Albritton & Herbert

[57] ABSTRACT

A system for providing work piece heating and welding controls at each individual location where welding operations must be performed. A centralized power station provides necessary AC and DC power to a distribution box for further dissemination through a "ring" of outlet stations supplied by the distribution box and located at discrete welding locations. Various special or general purpose consoles are located at each welding location to enable the welder to perform the welding and heating operations assigned, and to have complete control over such operations at the location.

27 Claims, 4 Drawing Figures

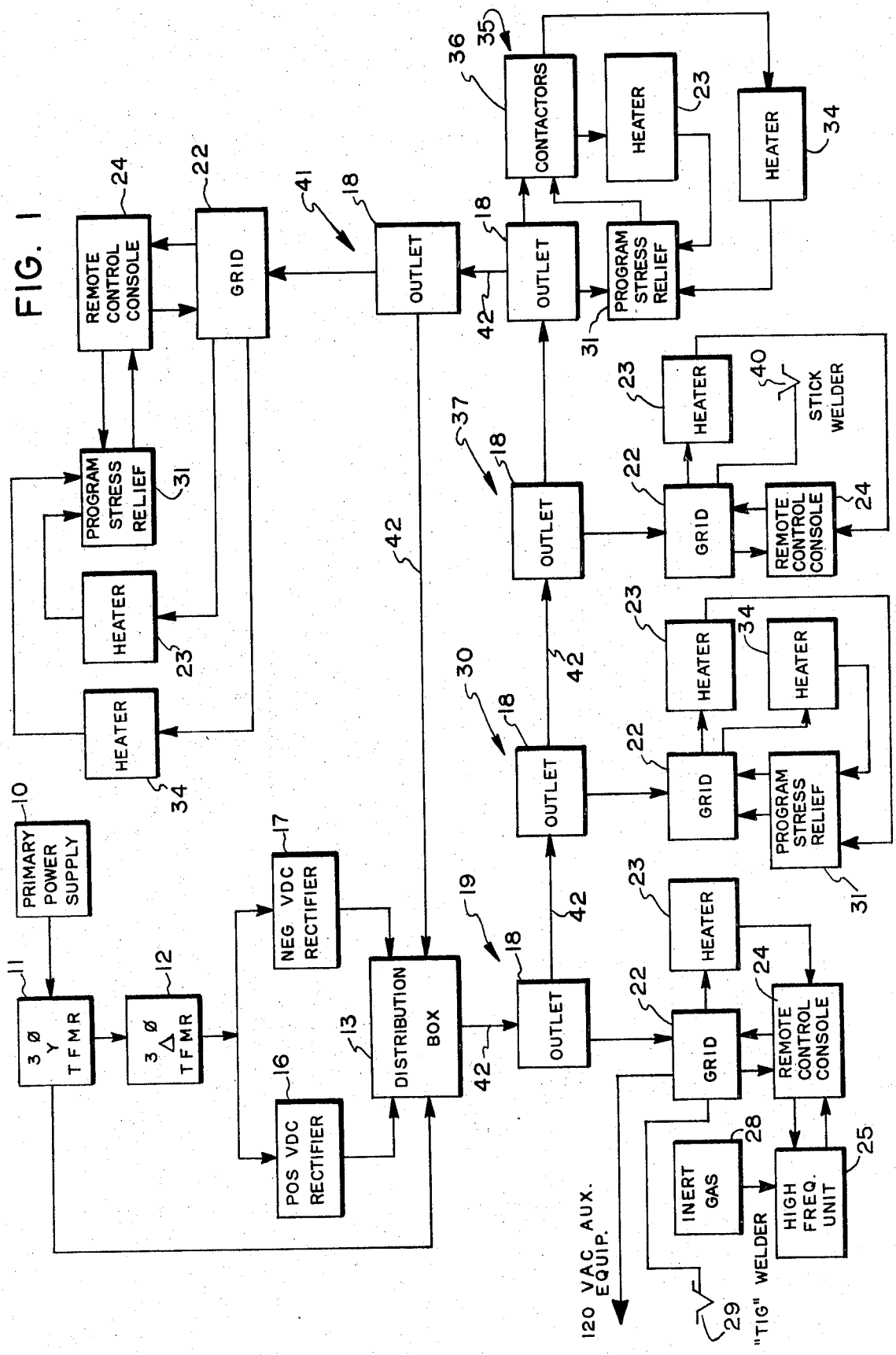

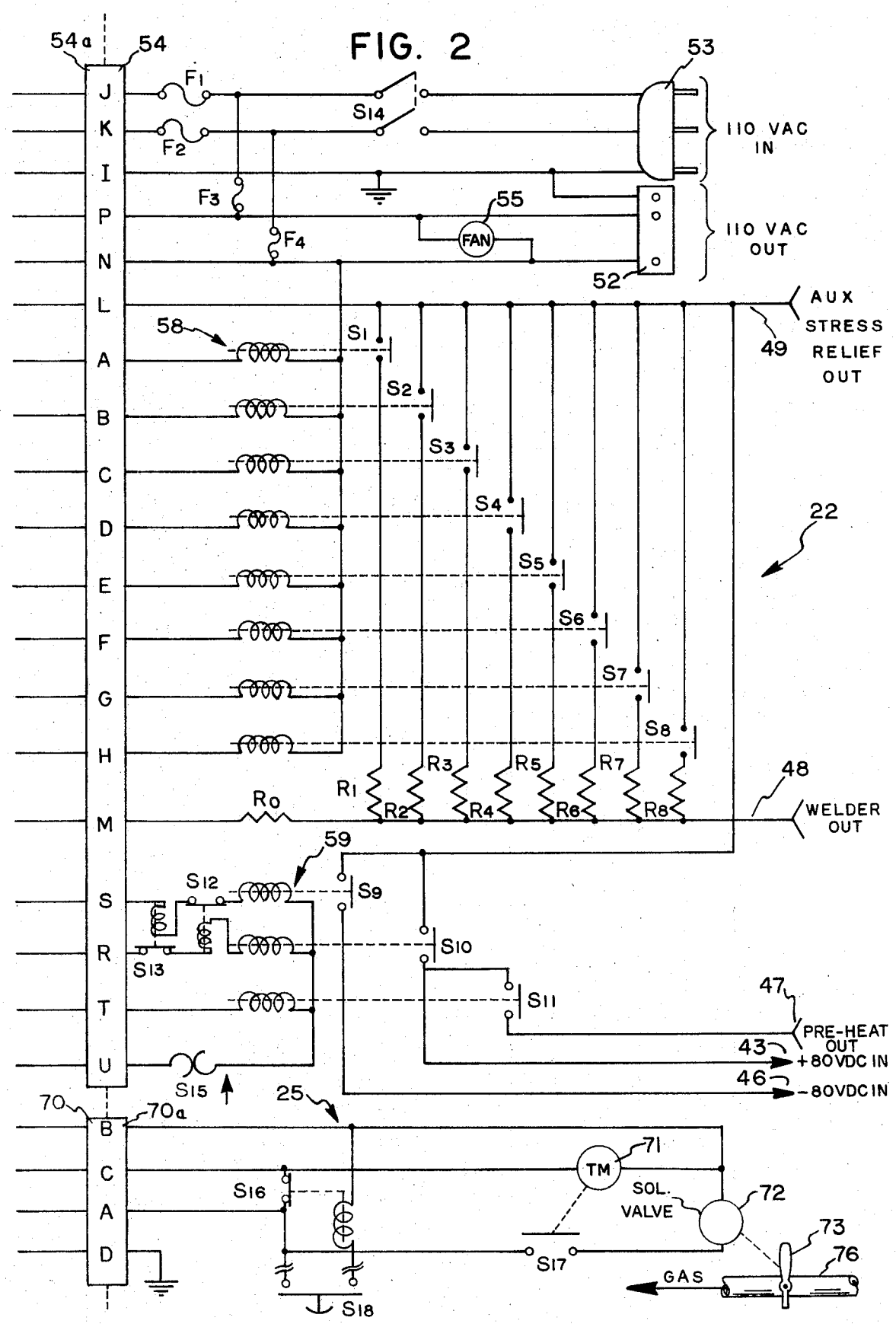

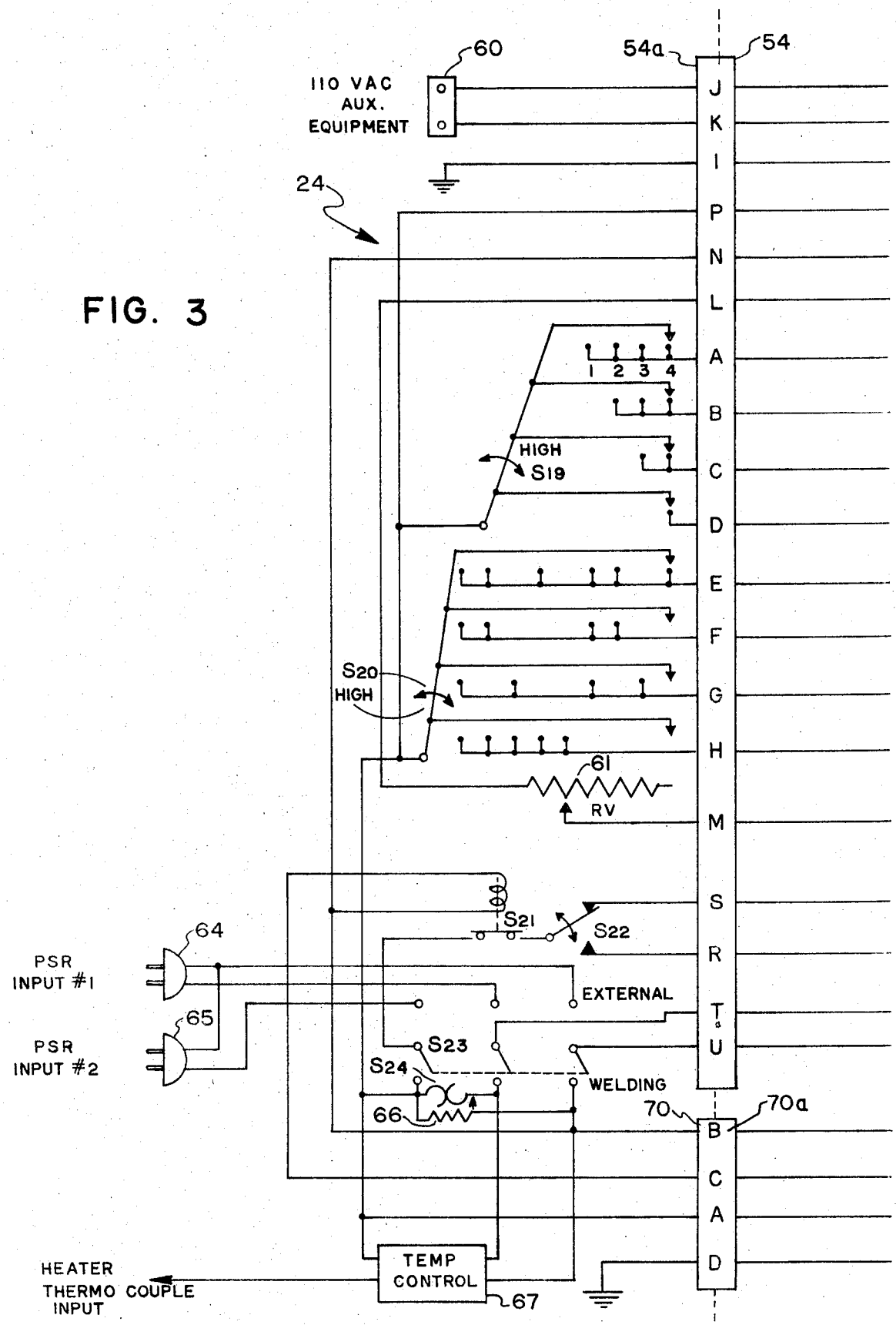

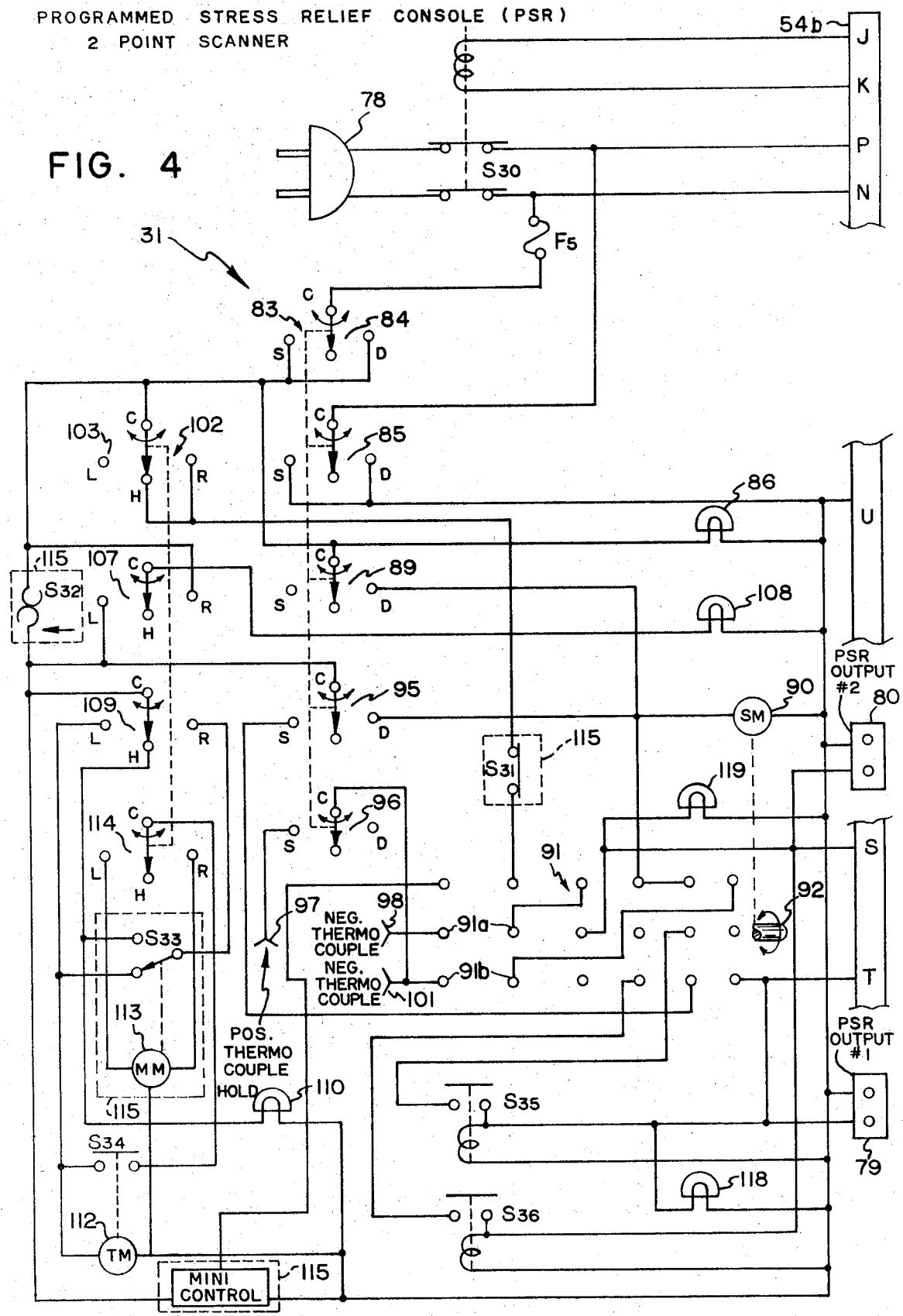

WORK PIECE HEATING AND WELDING CONTROL SYSTEM

BACKGROUND OF THE INVENTION

The invention relates to a work piece heating and welding control system and more particularly to such a system which affords complete control over all heating and welding operations at the specific location of such operations.

At most construction sites where welding is required the operations must take place at a large number of different locations throughout the construction site. For example, in a high rise building there is a great deal of vertical dispersion with welding of one type or another occurring at every floor and oftentimes at locations between floors. In construction of other types, for example in the fabrication of a petro-chemical plant, construction is spread over a large area horizontally requiring extensive horizontal dispersion of welding stations. Welding and heating in any construction may be required at various locations throughout the construction at different periods of time and for different lengths of time.

Welding equipment is relatively cumbersome and in the past it has been the practice to move the equipment from point to point throughout the construction site to meet the welding requirements at various locations. The alternative was to locate the main power generating equipment at some central point and run long, high voltage leads out to the various welding and heating locations. The former scheme is obviously an inefficient use of equipment prolonging construction time. The latter scheme necessitates the welder leaving his work and travelling long distances back to the centralized power generator location to adjust welding controls. More often than not the welding current level is left at a non-optimum level because of reluctance on the part of the welder to travel the distance between the welding location and the power generating equipment. Resulting weld joints are often not optimum quality. A clear need exists for a completely integrated system having a centralized power generator, capable of supplying many work piece heating and welding locations, and affording the welder control at the location for every type of work piece heating and welding operation required.

SUMMARY AND OBJECTS OF THE INVENTION

The work piece heating and welding control system is used for joining metal articles at construction sites where many widely dispersed heating and welding operations are required simultaneously. The system is energized by a high power electrical source providing the necessary AC and DC power at a relatively low voltage. Means for distributing the electrical power to outlet stations at the various heating and welding locations are provided. Various power and control consoles are provided at the heating and welding locations to accomplish particular purposes. A grid console is provided to supply welding probe and heating power. A remote control console is provided to control voltage and current produced by the grid console. A modified high frequency console is available for tungsten inert gas welding, and a programmed stress relief console is available to control single or dual preheat or post-heat operations at the welding locations. These consoles are designed to be used individually or in combination as the welding and heating requirements dictate.

In general, it is an object of the work piece heating and welding controls system to provide integrated control over all heating and welding operations at each of many discrete welding operation locations.

Another object of the work piece heating and welding control system is to provide tungsten inert gas welding and stick welding as desired at each individual welding location with a minimum of equipment relocation.

Another object of the heating and welding control system is to provide light weight modular components to provide for specific welding and heating requirements at individual welding locations.

Another object of the heating and welding control system is to eliminate duplication of equipment at individual welding locations.

Another object of the heating and welding control system is to maintain continuity of work at individual welding locations by providing complete control for all heating and welding operations required at the individual location.

Another object of the heating and welding control system is to provide safety by means of a voltage distribution system, and economy through the elimination of the necessity for armoured cables or for cables enclosed in conduit.

Another object of the heating and welding control system is to utilize inherent diversity factors arising from intermittent heating and welding operations at various welding locations to obtain economy in power generation and distribution equipment.

Another object of the heating and welding control system is to provide programmed preheat and postheat controlled at individual welding locations.

Additional objects and features of the invention will appear from the following description in which the preferred embodiments have been set forth in detail in conjunction with the accompanying drawings.

BRIEF DESCRIPTION OF THE DRAWINGS

FIG. 1 is a block diagram of the heating and welding control system showing various welding location equipment combinations.

FIG. 2 is an electrical schematic diagram of the automatic grid console and the modification to the high frequency unit.

FIG. 3 is an electrical schematic diagram of the remote control console.

FIG. 4 is an electrical schematic diagram of the programmed stress relief console.

DESCRIPTION OF THE PREFERRED EMBODIMENTS

The system described herein operates from a central electrical power source, provides the necessary forms of electrical power, distributes electrical power to widely dispersed locations where heating and welding operations are to be performed, and includes a number of light weight modular components for providing complete control of all heating and welding operations at the locations where the heating and welding takes place.

Referring to FIG. 1, a main centralized power source 10 is shown. The power source 10 may be of almost any type as long as it has the capability of delivering sufficient power to support the discrete heating and welding operations. Determination of power source type is based in part on a consideration termed diversity factor. The diversity factor is the ratio of the average electrical load used by the total number of welding stations to the maximum electrical load when all welding stations are using maximum power. Diversity considers the average electrical load when a number of welders are working since not all welders will be working at the same time or using the same power form. In this particular embodiment the central power source 10 is indicated as a single phase 480 VAC supply. The central power supply 10 energizes a three phase 120 VAC wye connected transformer 11. The output from three-phase wye connected transformer 11 is directed to a three-phase delta connected transformer 12 and to a distribution box 13. The output from three-phase delta transformer 12 is connected to first and second rectifiers 16 and 17. First rectifier 16 produces a negative DC output at 80 volts and is connected to distribution box 13. Second rectifier 17 produces a positive DC output at 80 volts and is also connected to distribution box 13. AC and dual polarity DC power are connected to a series of outlet stations 18 located at the various locations where discrete heating and welding operations are to be accomplished and generally describe a ring having a return path to the distribution box 13.

As further shown in FIG. 1 various combinations of light weight modular components may be assembled at the discrete heating and welding locations. A tungsten inert gas welding and heating combination 19 includes an automatic grid console 22 connected to outlet station 18. Grid console 22 is connected to a work piece heater 23 and to a remote control console 24. Work piece heaters mentioned in this disclosure are preferably but not necessarily of the type described in U.S. Pat. No. 3,482,080. In the event optional closed-loop temperature control is desired, a temperature sensor is included in heater 23 and is connected to remote control console 24. Remote control console 24 generates control signals through control selection which are connected to grid 22. A high frequency unit 25 is necessary for tungsten inert gas welding and is connected to remote control console 24. An inert gas supply 28 is connected to high frequency unit 25. A tungsten inert gas (TIG) welding probe 29 is connected to grid console 22. Grid console 22 also provides 120 VAC for auxiliary equipment (not shown).

A programmed stress relief combination 30 with a grid console 22 is also shown in FIG. 1. Grid console 22 is connected to outlet station 18 as before. A programmed stress relief console 31 is connected to grid console 22. Heater 23 and an additional heater 34 are also connected to grid console 22. Temperature sensing devices are included in heater 23 and additional heater 34 and are connected to programmed stress relief console 31. Programmed stress relief console 31 generates signals through console control selection which are connected to grid 22 for controlling power delivered to heaters 23 and 34.

A programmed stress relief combination 35 without a grid console 22 may be used. Combination 35 utilizes a plurality of contactors 36 receiving power from outlet 18 for supplying power to heater 23 and 34. Heater 23 and 34 include temperature sensing means producing a signal proportional to temperature which is connected to programmed stress relief console 31. Programmed stress relief console 31 is powered by outlet 18 and produces a control signal according to control selections made at console 31 which are directed to the contactors 36 for controlling the power consumed by heaters 23 and 34.

Combination 37 includes outlet 18 connected to grid 22 which is connected to heater 23. Grid 22 is also connected to remote control console 24 in which control signals are generated by selection at controls on the face of the console 24 and directed back to the grid console 22. Heater 23 may or may not include a temperature sensor producing a signal proportional to temperature. In the event such a temperature sensor is included a control loop about the heater 23 is closed when the signal produced by this temperature sensor is connected back to remote control console 24 for control purposes. In the event such temperature sensor is not present in heater 23 a control on the face of console 24 provides an open loop adjustment for temperature in heater 23. These means for heater control are termed energy regulators. "Stick" welding apparatus 40 is connected to grid 22 and controlled through the forementioned connection between remote control console 24 and grid 22.

A dual heating combination 41 is shown in FIG. 1. Outlet 18 is connected to grid 22 which supplies power to heaters 23 and 34. Remote control console 24 is connected to grid 22 and programmed stress relief console 31 is connected to remote control console 24. Temperature sensors producing signals proportional to temperature are included in heaters 23 and 34 and such temperature proportional signals are connected to programmed stress relief console 31. Programmed stress relief console 31 produces control signals which are connected to remote control console 24 for controlling power consumed by heaters 23 and 34 from grid 22.

The outlets 18 are generally configured in a "ring" extending from distribution box 13. The various light weight modular component combinations connected to each outlet 18 are connected in parallel with one another. The "ring" of outlet stations 18 are connected to each other and to the distribution box 13 by cables 42 no larger than 70 mm² in cross-sectional area which may be laid in parallel if necessary. The relatively low 80 VDC level distributed through cables 42 removes the necessity for armoured cable or for running the cable through permanent conduit installations.

The automatic grid console 22 is contained in cabinet having input terminals 43 and 46 for positive and negative 80 VDC respectively as seen in FIG. 2. A pre-heat output jack 47, a welder output jack 48, and an auxiliary stress relief output jack 49 are also located on the grid cabinet. An auxiliary AC equipment output 52 is provided along with an AC input 53 for 110 VAC commercial power. A "power-on" switch S14 is located in the 110 VAC line from AC input 53. A multipin connector 54 is mounted on the cabinet for connection with remote control console 24 and programmed stress relief console 31. Fuses F1 and F2 are located in the AC lines between one side of switch S14 and the multipin connector 54. A 110 VAC commercial power input is connected to the multipin connector 54 and the auxiliary equipment output 52 through fuses F3 and F4. A fan 55 is connected to the 110 VAC input and mounted adjacent to grid resistance elements R1 through R8 which have one end connected at a common point. Grid element switches S1 through S8 are connected to the opposite ends of grid resistance elements R1 through R8 respectively. Grid element switches S1 through S8 are normally open electrically actuated switches having actuating coils indicated generally at 58 with one common end connected to one side of the 110 VAC line and their opposite ends connected to separate pins on multipin connector 54. A resistance $R_o$ is brought to a separate pin at multipin connector 54 on one end, connected to the common end of resistors R1 through R8, and subsequently connected to welder output 48. The side of grid element switches S1 through S8 opposite the side connected to grid resistance elements R1 through R8 are brought to a common connection, connected to a pin on multipin connector 54 and to auxiliary stress relief output 49.

Switches S9, S10 and S11 are power contactor switches which are normally open and electrically actuated. The negative DC input from terminal 46 is connected to one side of contactor switch S9. The positive DC input from terminal 43 is connected to one side of contactor switches S10 and S11. The opposite side of contactor switch S11 is connected to preheat output 47. The opposite sides of contactor switches S9 and S10 are joined together and connected to auxiliary stress relief output 49. Electrical actuation for contactor switches S9, S10 and S11 is provided by coils indicated generally at 59. One side of actuating coils 59 is terminated at a common point and connected to one side of a thermal "break" switch S15. Switch S15 is normally closed and set to open at a predetermined high temperature. The other side of S15 is connected to a pin on multipin connector 54. The actuating coil 59 serving to actuate contactor switch S11 has its other end terminated directly to a separate pin on multipin connector 54. The contactor actuation coil 59 serving contactor switch S9 has its other end attached to one terminal of a switch S12. The opposite terminal of switch S12 is connected to one side of an actuating coil for switch S13. The other side of the actuating coil for switch S13 is connected to a separate pin on multipin connector 54. Actuating coil 59 serving contactor switch S10 has its other end connected to one side of an actuating coil for a switch S12. The other side of actuating coil for switch S12 is connected to one terminal of switch S13. The opposite terminal of switch S13 is connected to a separate pin on multipin connector 54. Switches S12 and S13 are normally closed devices.

The remote control console 24 is a cabinet containing circuitry for the control of power consumption at the various outputs of the automatic grid console 22. The electrical schematic diagram for remote control console 24 is shown in FIG. 3. A control outlet in the form of a multipin connector 54a which mates with multipin connector 54 on automatic grid console 22 is connected to remote control console 24. A 110 VAC output 60 is connected to multipin connector 54a to provide power for auxiliary equipment. A multi-pole rotary wafer switch S19 is provided, having the rotary contact connected to one side of the 110 VAC line at multipin connector 54a. Each of the wafers in rotary switch S19 is connected to an individual pin on multipin connector 54a. A second multi-pole rotary wafer switch S20 is connected in similar fashion with the rotary contact connected to the same side of the 110 VAC line as the rotary contact on S19 and with the individual wafers connected to separate pins on the multipin connector 54a. A high power potentiometer 61 has one end of its resistance element connected to a pin on multipin connector 54a, and its moving contact, or wiper, connected to a separate pin on multipin connector 54a.

A polarity switch S22 of the single pole double throw type has a connection to a separate terminal on multipin connector 54a for each direction of throw. A normally closed electrically actuated switch S21 is in series with the common side of switch S22. The other side of switch S21 is connected to a first pole on the movable contact side of a triple pole double throw switch S23. The second and third poles on the movable side of switch S23 are connected to separate pins on multipin connector 54a. One side of double throw switch S23 is connected to PSR 1 and 2 connectors 64 and 65 respectively for receiving heater control signals from programmed stress relief console 31 and is termed the "external" position. The other side of triple pole switch S23 has an adjustable thermal "break" switch S24 connected between the first and second poles which is set to open at a preselected high temperature. A heater element 66 is disposed adjacent to thermal switch S24 and connected across the 110 VAC line between the first and third poles of S23 for actuating thermal switch S24. This latter side of switch S23 is labelled the welding and preheat side. The combination of switch S24 and heater element 66 is one form of energy regulator in remote control console 24.

An optional temperature control module 67 may function as the energy regulator either in place of or in conjunction with the combination of switch S24 and heater element 66. Temperature control module 67 requires an input signal which is proportional to temperature from a temperature sensor mounted in work piece heater 23.

Normally closed switch S21 is actuated by a coil with ends connected to separate terminals on a high frequency unit connector 70. One end of the actuation coil for switch S21 is connected to one side of the 110 VAC line at multipin connector 54a. The other side of the 110 VAC line at multipin connector 54a is connected to a separate pin on high frequency unit connector 70.

A modification has been made to high frequency unit 25 for TIG welding to protect the tungsten probe and to assure a quality weld joint by affording free flow of inert gas at the weld while the weld joint temperature is high enough to be in the oxidizing range. A schematic of the modification is seen in FIG. 2. The high frequency unit 25 has a connector 70a attached which mates with high frequency unit connector 70 on remote control console 24. A normally closed electrically actuated switch S16 is connected between two separate terminals on connector 70a. One side of switch S16 is attached to one terminal of a timer motor 71. The other side of switch S16 terminates at one side of a switch S17 which is actuated by timer motor 71. The other side of switch S17 is connected to a solenoid valve 72 which positions a valve 73 to control gas flow through a gas pipe 76. The other side of solenoid valve 72 is connected to one side of the timer motor 71 and brought to a pin on connector 70a. One side of the actuating coil for switch S16 is connected to the common point between timer motor 71 and solenoid valve 72 and the other side of the actuating coil for switch S16 is brought to one side of a normally open tungsten inert gas welding probe switch S18 for actuating the TIG welding probe 29. The other side of the normally open probe actuating switch S18 is connected to the common point between switches S17 and S16 which, as mentioned before, is connected to a pin at connector 70a on the high frequency unit 25.

A programmed stress relief console 31 is a separate modular component providing single point control for heater 23 or dual point scanner control for heaters 23 and 34. An electrical schematic diagram for the programmed stress relief console 31 is seen in FIG. 4. The programmed stress relief console 31 may be connected directly to an outlet 18, an automatic grid console 22, or a remote control console 24 as shown in FIG. 1. When connected to automatic grid console 22 110 VAC input and output is through multipin connector 54b which mates with multipin connector 54 attached to grid console 22. In such a case normally closed dual switch S30 is actuated to the open position isolating a 110 VAC input connector 78. If the programmed stress relief (PSR) console 31 is connected directly to outlet station 18 or remote control console 24 110 VAC is supplied through connector 78 and heater control signal outputs are provided at connectors 79 and 80 for control of heaters 23 and 34 respectively.

A five wafer three position single or dual heater control selector switch 83 is provided on the face of PSR console 31. One position is "off", another position, marked with the letter "S" in FIG. 4 is for single heater control, and the third position, marked with the letter "D", is for dual heater control. One side of the 110 VAC line is brought to a moving or common contact on the first wafer 84 of switch 83. The other side of the 110 VAC line is brought to the moving or common contact of the second wafer 85 of switch 83. Single or dual heater control selection at switch 83 connects 110 VAC across the "main on" light 86. It also brings one side of the 110 VAC line to the output terminals in multipin connector 54b and connectors 79 and 80. The third wafer 89 on switch 83 has only one connection from the dual control terminal to a scanner motor 90 which drives a program switch 91, shown generally as a set of 18 contacts, through a shaft 92. Program switch 91 has a number 1 output side 91a seen as the center horizontal row of contacts, and a number 2 output side 91b seen as the bottom horizontal row of contacts.

A fourth wafer 95 on switch 83 has the dual side connected to scanner motor 90 and the single side connected to a terminal on program switch 91. A fifth wafer 96 on switch 83 has its movable contact connected to one side of the temperature sensor input from work piece heater 34. The single control side of fifth wafer 96 is connected to a jack 97 which receives signals from the temperature sensors in work piece heaters 23 and 34. The other contact from the temperature sensors is terminated at jacks 98 and 101.

A four wafer three position program selector switch 102 is located on the face of PSR console 31. The three positions on switch 102 are for a lowering temperature program, a holding temperature program, or a rising temperature program and the switch contacts are designated by the letters L, H, and R respectively in FIG. 4 at switch 102. The first wafer 103 on switch 102 connects one side of the 110 VAC line to an interruptor switch S31 when in the "hold" or "rising" position. The other side of switch S31 is connected to one of the contacts in program switch 91. The second wafer 107 on switch 102 connects 110 VAC across a "program energized" light 108 when in the "rising temperature" position. 110 VAC is connected to the "program energized" light 108 when in the "lower temperature" position through a microswitch S32 which is normally open below 600°F and normally closed above that temperature in this embodiment.

One side of the 110 VAC line is brought to the movable contact of the third wafer 109 of switch 102 through microswitch S32. The "hold" contact of wafer 109 is connected to a "hold" light 110 which is in turn connected to the other side of the 110 VAC line. The lowering temperature contact at wafer 109 is connected to a timer motor 112 which is in turn connected to the other side of 110 VAC line. The rising temperature side of wafer 109 is connected to a switch S33 which is positioned in one of two positions by a minimotor 113. One position of S33 provides power to the minimotor 113 through wafer 109 and the other position interrupts the 110 VAC circuit to minimotor 113 and closes the circuit to "hold" light 110. Timer motor 112 operates a switch S34 to be closed for selected percentage of elapsed time as indicated at a control on the face of PSR console 31. Switch S34 is connected to the movable contact at the fourth wafer 114 on switch 102. The other side of switch S34 is connected to the lowering temperature contact at the third wafer 109 of switch 102 and to one of the contacts of switch S33.

A minicontrol module 115 is connected between the two sides of the 110 VAC line through switch S32. The minicontrol module 115 physically contains the components S32, S31, S33, and minimotor 113 together with some standard circuitry for comparing the temperature proportional signals introduced at jacks 98 and 101 and for producing a control signal as a result of that comparison. A comparison signal from minicontrol 115 is connected to program switch 91 which, in accordance with the switch program, connects the comparison signal to the actuating coil of a normally open switch S35 to connect the other side of the 110 VAC line to output connector 79 for control of heater 23. In like manner, signals are connected to the actuating coil of normally open switch S36 to connect the 110 VAC line to connector 80 for control of work piece heater 34. Contactor light 118 illuminates by being connected across the 110 VAC line when switch S35 is closed and contactor light 119 illuminates by being connected across the 110 VAC line when switch S36 is closed.

Turning now to the operation of the metal joining control system for heating and welding reference is made to FIG. 1. The system requires a primary or main central power source 10 for deriving specific AC and DC power forms from power source 10 for purposes of reliability and regulation. 110 VAC power is provided by three-phase wye connected transformer 11, and regulated negative and positive DC is provided by rectifiers 16 and 17 respectively. The DC voltage is purposely held low, at 80 volts DC, to provide handling safety and economy of distribution cable installation. Cables 42 with a maximum copper cross-sectional area of 70 mm² are provided to distribute the power from the distribution box 13 to the outlet stations 18. The busses in the distribution box 13 between the inlet and outlet terminals are fused for the protection of the various system components. Fuses are also provided between the main busses and the outlets from outlet stations 18 to the various component combinations at the welding locations.

A representative number of modular component combinations is seen attached to different outlet stations 18 in FIG. 1. TIG welding and heating combination 19 is shown having an automatic grid console 22 receiving the power from outlet station 18. The positive and negative DC power is connected to terminals 43 and 46 respectively in FIG. 2. The 110 VAC power is connected to connector 53. DC power is not distributed internally in the grid console 22 until the contactors S9, 10 and 11 are actuated. AC power is distributed within grid console 22 by actuating on/off switch S14. Turning swtich S14 on provides AC power to multipin connector 54 through fuses F1 and F2 to pins J and K. Pins P and N on connector 54 are also energized through fuses F3 and F4. Fan 55 is turned on and auxiliary equipment outlet 52 is energized. Such auxiliary equipment as hand grinders, lights and electrode ovens may be connected to auxiliary equipment outlet 52.

It may be seen in FIG. 2 that the actuator circuits for contactors S9, 10 and 11 are connected to pins in multipin connector 54. The actuating circuits have a common connection at pin U in connector 54 through heat sensitive switch S15. Switch S15 operates to open in the event of overheating in the grid console 22 which opens all three contactors S9, 10 and 11. With switch S15 closed, a remote signal received at pin S on connector 54 will open normally closed switch S13 which is connected to pin R on connector 54, and through normally closed switch S12, simultaneously energize the actuator coil 59 for contactor S9 placing it in the closed position. This places negative DC voltage at pin L on connector 54 and to one side of grid element switches S1 through S8. It also opens the actuating circuit for contactor S10 when S13 is opened providing an interlock between the positive and negative DC supplies to prevent a short circuit between them by simultaneous closing of contactors S9 and S10. In like manner a remote signal received at pin R on connector 54 will close contactor S10 and open the actuation circuit at normally closed switch S12, precluding closure of contactor S9. In this event positive DC voltage will be placed on pin L of connector 54 and to auxiliary stress relief output 49. In the event preheat is to be used, a remote signal is directed to pin T on connector 54 energizing the actuator coil 59 for contactor S11 placing the positive DC voltage at the preheat output 47.

Connector 54 on grid console 22 mates with connector 54a attached to remote control console 24 as seen in FIG. 3. In this fashion 110 VAC power is delivered to auxiliary equipment output 60 on remote control console 24. 110 VAC power is also delivered to pins P and N on connector 54a. Pin P energizes coarse multipole current control rotary switch S19 and fine multipole current control rotary switch S20. Switches S19 and S20 can be seen to have four wafers each, which are connected to pins A through H on connector 54a. Coarse step and fine step current control signals are transmitted through connector 54 to grid element switch actuation coils 58 in FIG. 2. Switch actuation coils 58 are terminated in a common connection at pin N on connector 54 to form a circuit across the 110 VAC line. A fine variable current control is provided by the high power potentiometer 61 in FIG. 3 which is connected between pins L and M on connector 54a.

Pin L, as mentioned before, on connector 54 receives the selected DC voltage through either contactor S9 or S10. Pin M on connector 54 is directed through a limiting resistor $R_0$ to the welder outlet 48. Fine current control 61 has a wider range than the step increment for current provided by fine multi-pole current control rotary switch S20. Thus a coarse step current increment selected at coarse control switch S19 is added to the fine step increment selected at switch S20 which is added to the fine variable current selection provided at high power potentiometer 61. By way of example, a current level of 117 amps may be selected in this embodiment by placing the coarse step control to the 100 A position actuating grid element swtiches S1 and S2, placing the fine step current control to the 15 A position actuating grid element switch S7, and rotating high power potentiometer 61 to provide an additional 2 amps as indicated on the console meter face. The sum of 100 A, 15 A, and 2 A (117 amps) will be delivered at welder output 48. It may be seen that since the DC voltage is regulated to maintain a certain level, welder output current is increased as more grid element resistance is switched into parallel combination by actuating combinations of grid element switches S1 through S8. The high current levels through grid resistance elements R1 through R8 cause them to generate heat energy which is dissipated by moving air over the elements with fan 55. Should fan 55 fail, or overheat occur for some other reason, switch S15 will open at a predetermined high temperature and open contactor actuators 59 opening contactors S9, 10 and 11 to remove the power from the grid resistance elements.

As mentioned above, polarity switch S22 in FIG. 3 selects positive or negative polarity at welder output 48 in FIG. 2. With switch S23 in FIG. 3 in the welding position, polarity switch S22 is connected through normally closed switch S21 to one side of the 110 VAC line at pin P on connector 54a. Pin T on connector 54a is also connected to the 110 VAC line at pin P through heat sensitive switch S24. With switch S22 in the position shown in FIG. 3, contactor actuating coils 59 in FIG. 2 will be energized closing contactor S9 and S11 and opening the circuit through the actuating coil 59 for contactor S10. Positive DC is delivered to preheat output 47 and negative DC is delivered to welder output 48 and auxiliary stress relief output 49. Heater element 66 is associated with contactor control and is connected across the 110 VAC line. When it heats switch S24 to a predetermined level, switch S24 opens interrupting power to pin T and opening contactor S11, removing power from preheat output terminal 47. Heater element 66 is adjustable to provide more or less heat directed on switch S24 for adjusting the amount of time the DC power to preheat output 47 will be interrupted. Thus one form of energy regulator is provided for work piece heater 23.

An optional temperature control module 67 is shown in FIG. 3 in parallel with thermal switch S24. Switch S24 and heater 66 may or may not be left in the circuit when temperature control module 67 is installed. Control module 67 is energized by the 110 VAC line and receives an input from a temperature sensor mounted in work piece heater 23. Control module 67 generates internally a signal depending upon a selection made at the face of remote control console 24 which is compared with the temperature sensor signal input. The comparison is utilized to open or close a switch in control module 67 which either places or removes 110 VAC on pin T of connector 54a which, through connector 54, energizes actuating coil 59 for contactor S11 in FIG. 2. Thus, temperature control module 67 provides a closed loop feedback control for regulating energy delivered through preheat output 47 whereas adjustable heater element 66 for switch S24 provides a manual control for preheat output 47.

An actuating coil is provided for normally closed switch S21 in remote control console 24 as seen in FIG. 3. This actuating coil is connected to connector 70 at pins B and C. The side of the actuating coil connected to pin B and connector 70 is also connected to pin N on connector 54a which is one side of the 110 VAC line. The other side of the 110 VAC line from pin P on connector 54a is connected to pin A on connector 70. Looking at FIG. 2 a high frequency unit modification circuit 25 is seen. It is connected to connector 70a which mates with connector 70 attached to remote control console 24. When connectors 70 and 70a are mated a circuit is completed through the actuating coil for switch S21 through switch S16 in circuit 25. This opens polarity switch S22 and neither contactor S9 nor S10 may be closed.

When TIG welding is contemplated, a high frequency unit is necessary to start the welding arc. Circuit 25 is a modification to the standard high frequency unit and serves to open polarity switch S22 so that welder output 48 is de-energized. This is necessary because of the nature of TIG welding. In undertaking TIG welding a tungsten electrode is used as the welder stinger and is never brought into direct contact with the material being welded. To do so would contaminate the pure tungsten electrode and cause imperfections in the weld. De-energizing welder output 48 until welding is undertaken precludes the possibility of accidentally touching the tungsten stinger to some foreign material and consequently fouling the tungsten probe. To begin welding switch S18 is depressed which actuates switch S16 to an open position in FIG. 2. This deenergizes the actuating coil for switch S21 in FIG. 3 and it returns to its normally closed position. Thus polarity switch S22 is energized and the selected DC polarity is provided at welder output 48. At the same time, timer motor 71 in FIG. 2 is energized closing switch S17. Switch S17 is seen to be in series with solenoid valve 72, which is subsequently energized opening valve 73 in gas pipe 76 allowing gas to flow through the pipe. The gas is supplied from inert gas supply 28 and is directed around the tungsten probe to preclude oxidation of the probe and the weld and thus maintain weld quality. When switch S18 is released switch S16 returns to its normally closed position opening switch S21 through connector 70a and 70. Timer motor 71 delays opening switch S17 for 5 to 7 seconds, allowing solenoid valve 72 to maintain valve 73 in the open position maintaining inert gas flow around the probe and adjacent weld joint portions until they have cooled to a point below that which introduce irregularities into the weld.

Looking now at combination 37 in FIG. 1, it is seen to include a grid console 22, a heater 23, a remote control console 24 and a stick welder 40. The operation of this combination is the same as that described above for combination 19 above except that the TIG welding probe is replaced by the stick welding "stinger" 40. The stick welder 40 holds a welding element or "stinger" which is brought into contact with the work piece to strike the welding arc and begin the weld. Weld current is controlled at the face of remote control console 24 as discussed above and the heater control may be open loop through the use of adjustable heater element 66 with switch S24 or may be closed loop through the use of temperature control module 67 and temperature sensor signal feedback from heater 23 to remote control console 24. The operator may control welder current and single heater temperature simultaneously through remote control console 24.

A combination of modular components 41 providing dual heater control is shown in FIG. 1. As discussed above, automatic grid console 22 receives AC and DC power from outlet station 18. Remote control console 24 is connected through connector 54a and 54 to grid console 22. In this instance switch S23 in FIG. 3 is positioned in the external position. This can be seen to remove temperature control module 67 and heater element 66 with heat sensitive switch S24 from the circuit. In their place appear input connectors 64 and 65. Input connectors 64 and 65 are connected to output connectors 79 and 80 respectively at PSR console 31. Heater control is now directed by PSR console 31 exclusively, and welding may not be performed from outlet 48 on grid console 22 as DC power will be interrupted in accordance with signals generated within PSR console 31 for the control of work piece heaters 23 and 34.

Heater 23 is connected to preheat output 47 and heater 34 is connected to auxiliary stress relief output 49 in grid console 22. Polarity switch S22 in remote control console 24 will dictate whether positive or negative DC will energize heater 34 through auxiliary stress relief output 49.

Referring to FIG. 4 110 VAC input is directed to connector 78 on PSR console 31 from remote control console 24. Switch S30 remains closed since the actuating coil attached to pins J and K on connector 54b is not energized. Consequently the first wafer 84 in single/dual heater control switch 83 is energized by one side of the 110 VAC line and the second wafer 85 is connected to the other side of the 110 VAC line. In the event dual heater control is selected at switch 83 one side of the 110 VAC line is delivered to one terminal at both connectors 79 and 80. The "main on" light 86 is illuminated and the scanner motor 90 is energized through the third wafer 89 of switch 83. Program switch 91 is caused to rotate through shaft 92. AC power is connected to program selector switch 102 which may be positioned in the "hold" position. In such a case, assuming a temperature greater than 600°F is selected at minicontrol 115 and exists at heaters 23 and 34, switch S32 is closed and "hold" light 110 illuminates. Temperature sensor signal inputs from heaters 23 and 34 are directed from input jacks 98 and 101 to minicontrol 115 for comparison with the signal generated by temperature selection at the dial on the face of PSR console 31. A signal is generated by minicontrol 115 in accordance with the comparison with the temperature sensor signal from heater 23 which is directed through the program switch to the actuating coil for switch S35. Switch S35 is closed providing a temperature control signal at the output connector 79 for heater 23. In like manner, minicontrol 115 generates a comparison signal upon receiving the signal from the temperature sensor mounted on heater 34, which is directed to program switch 91, to the actuating coil for switch S36 according to the program which closes delivering a heater control signal to output connector 80 for control of heater 34. Actuation of switches S36 and S35 can be seen to remotely control the closure of contactors S9, 10, and 11 for providing DC power to the heater output points 47 and 49 on grid console 22.

In the event program selector switch 102 is positioned in the raising temperature position, program light 108 is illuminated. In such an instance the percent timer motor 112 control is positioned to select the percentage of a predetermined time period that minicontrol 115 is to operate. Timer motor 112 thus acts as a divider to cut down the time that minimotor 113 is in operation and thus to cut down the rate of heater energy consumption and the rate of rise of temperature at the heater. When lowering temperature is selected at program switch 102, minimotor 113 is rotated in the opposite direction and timer motor 112 opens and closes switch S34 in accordance with timer motor percentage setting to again divide the rate of temperature lowering which would be provided by minimotor 113 if its rotation was not interrupted. When the shaft position of minimotor 113 and the temperature dial setting on the face of PSR console 31 coincide whether temperature rising or temperature lowering has been selected at program switch 102, switch S33 is placed in an open condition opening the circuit to minimotor 113 and illuminating "hold" light 110.

Minicontrol 115 in FIG. 4 contains those components outlined in dashed lines S32, S31, S33 and minimotor 113. Switch S32 serves to open the circuit at temperatures below 600°F in this embodiment to allow air cooling of postheated weld joints below 600°F by de-energizing scanner motor 90 when lowering temperature programming is selected on the program selector switch 102. Switch S31 is actuated opened or closed according to the comparison between the temperature sensor signal and the signal arising from control dial selection which takes place internally in minicontrol 115. For example, if a rising temperature program is selected at program selector switch 102, and the temperature sensor signal from heater 23 indicates temperature is lower than that selected in minicontrol 115, switch S31 will be urged to the closed position passing a signal through program switch 91 in accordance with the program for transmittal to switch S2 to actuate contactor S11 in FIG. 2 and provide power at preheat output 47 for work piece heater 23. Switch S31 is the common control for both heaters 23 and 35 and must be closed for a remote control signal to be generated within PSR console 31 which will cause transmittal of power to either heater 23 or 34. It may be seen that contactor light 118 is illuminated when a control signal is present at heater control output 80 and that contactor light 119 is illuminated when a control signal is present at output 79. These two outputs are directed to inputs 65 and 64 respectively on FIG. 3. With switch S23 in the external position connectors 65 and 64 are connected through multipin connector 54a and mating multipin connector 54 to the actuating coils 59 for either contactor S9 or S10 to respectively provide power through output 49 in FIG. 2 for heater 34, and to actuating coil 59 for contactor S11 to provide power through output 47 for heater 23. In this fashion top and bottom heater control for large pipe welds may be obtained. Independent top and bottom heater control eliminates the tendencies for the top of the pipe to become hotter than the bottom, which produces differing final weld characteristics due to unequal weld joint post heat treatment.

A PSR console, heater and contactor combination 35 is shown in FIG. 1. This combination is utilized when heating only is to be performed at a discrete welding location. A contactor console 36 containing only contactors to be controlled by signals generated in PSR console 31 as described above coupled with one or two heaters 23 and 34 completes this combination. PSR console 31 functions as described above for single or dual heater control and for selection of a heater program. Heaters may be held at a preselected temperature in the "hold" position, caused to rise at some selected fraction of the 600°F per hour maximum rate, or caused to lower at some selected fraction of the maximum 600°F per hour rate down to a temperature of 600°F. In this combination it is convenient to provide the 110 VAC input from outlet station 18 to PSR console 31 at connector 78, and to provide heater control signals from PSR output connectors 79 and 80 directly to the actuating coils 59 for the appropriate contactors.

A PSR console and grid combination 30 is similar to combination 35. The advantage to be seen in combination 30 derives from the presence of grid console 22 in the event welding operations are contemplated at some time other than when dual heater control is needed. The combination may also be used for simultaneous single heater control and welding since unequal top and bottom heating is not as critical as during post heat. Otherwise the combination 30 functions in the same fashion as the combinations 35 and 41, except that multipin connector 54b in FIG. 4 is mated with multipin connector 54 from the grid console 22 in FIG. 2. In such a case 110 VAC is placed on the pins J and K at connector 54b actuating switch S30 and opening the circuit behind the pins on connector 78. 110 VAC is delivered to the PSR console 31 through pins P and N in multipin connector 54b and heater control signals are delivered to grid console 22 through pins U, S, and T which are seen to lead to the actuating coils 59 for the contactors S9 and S11. Dual independent closed loop heater control is provided for heaters 23 and 34 in this combination.

In the event single heater control is selected by rotating the heater control switch 83 to the single control position, it is seen in FIG. 4 that power is removed from scanner motor 90. If the program switch shaft 92 has come to rest in a position on the number 2 output side of program switch 91, power is directed to scanner motor 90 through program switch 91 to position it to the number 1 output side of program switch 91 and to there break the circuit to scanner motor 90 leaving it de-energized for the remainder of the time single heater control is selected on heater control switch 83.

The heating and welding system disclosed herein provides a system using lightweight modular components and a low voltage distribution system which eliminates duplication of equipment and manpower and maintains continuity of work. Additional safety and economy of installation is derived from the low voltage distribution. Utilization of a 60 percent diversity factor provides economy in the distribution system and power sources. All controls for the welder are available at the discrete heating and welding locations, providing savings in man hours and improvement in weld quality. Equipment at a discrete welding location may be arranged in component combinations to match the work schedule requirements.

The foregoing embodiments have been described for use in accomplishing weld joint preheat and postheat as well as tungsten inert gas welding and stick welding. The invention disclosed herein has application with semi-automatic metal inert gas welding and with automatic submerged arc welding as well. Complete portability of the equipment with full control of welding and heating functions at the point of weld is the end result accomplished by the disclosed system.

I claim:

1. A metal joining control system of the type used at construction sites requiring simultaneous discrete welding operations at a plurality of widely dispersed locations and energized by an electrical power source comprising means connected to said electrical power source for providing commercial AC power, means for converting said AC power to dual polarity DC power, means for distribution of said AC and dual polarity DC power to said widely dispersed locations, means for termination of said AC and dual polarity DC power at said widely dispersed locations, a grid console at each of said locations for receiving said distributed AC and DC electrical power, and a remote control console at each of said locations connected to said grid console for controlling electrical power consumed in joining metal articles in said discrete welding operations.

2. A metal joining control system as in claim 1 together with at least one work piece heater connected to said grid console, said heater operating to preheat the metal articles prior to welding.

3. A metal joining control system as in claim 1 wherein said means for providing commercial AC power comprises a multiphase transformer for receiving power from said AC source and providing a three phase output.

4. A metal joining control system as in claim 1 wherein said means for providing dual polarity DC power comprises a first rectifier for receiving said commercial AC power and providing a negative DC output, and a second rectifier for receiving said commercial AC power and providing a positive DC output.

5. A metal joining control system as in claim 1 wherein said means for distributing said AC and dual polarity DC power comprises a distribution box having input terminals for receiving said AC and dual polarity DC power, respective output terminals on said distribution box, and fuses connected in said distribution box between said input and respective output terminals and wherein said means for terminating said AC and dual polarity DC power comprises a plurality of outlet stations located at said widely dispersed locations for receiving said AC and DC power, and circuit means for connecting said respective output terminals with said outlet stations.

6. A metal joining control system as in claim 1 together with a high frequency unit connected to said remote control console, an inert gas supply connected to said high frequency unit, a tungsten inert gas welding probe connected to said grid console, a normally open probe actuating switch for said welding probe, and an inert gas control circuit connected to said remote control console, said gas control circuit operating to control the inert gas flow around said tungsten welding probe while performing tungsten inert gas welding.

7. A metal joining control system as in claim 6 together with a work piece heater connected to said grid console.

8. A metal joining control system as in claim 6 wherein said high frequency unit is of the type having a solenoid operated inert gas valve and wherein said inert gas control circuit comprises a normally open gas switch for actuating said inert gas valve, a timer motor in circuit with said normally open probe actuating switch and a normally closed interrupter switch operating to interrupt power to said tungsten welding probe until said normally open probe actuating switch is closed, said probe actuating switch serving to complete the circuit through said timer motor when closed, said timer motor operating to close said normally open gas switch to open said gas valve allowing inert gas flow around said probe while said normally open probe actuating switch is closed and for a predetermined period of time thereafter.

9. A metal joining control system as in claim 1 wherein said remote control console has power selection switches and wherein said grid console comprises a cabinet, a welder output connector mounted on said cabinet, a preheat and postheat output connector mounted on said cabinet, a control input connector mounted on said cabinet, a network of grid resistance elements connected in parallel mounted in said cabinet having one side connected to said welder output connector, a plurality of grid element switches connected one each between each grid resistance element and said control input connector, a fan mounted adjacent to said network of grid resistance elements connected to said electrical power source for cooling said network, a first DC contactor for connecting the positive DC power to said grid element switches, a second DC contactor for connecting the negative DC power to said grid element switches, a third DC contactor in parallel with said first DC contactor for connecting the positive DC power to said preheat and postheat output connection, said first, second, and third contactors and grid element switches being responsive to said remote control console selection, and interlock means between said first and second contactors for opening one DC contactor actuating circuit when the other is remotely selected, said grid console operating to allow concurrent welding and heating operations.

10. A metal joining control system as in claim 9 together with a thermal switch mounted in said cabinet for opening said first, second, and third contactor circuits at a predetermined temperature in the event of overheating within said cabinet.

11. A metal joining control system as in claim 9 together with an auxiliary stress relief output connection mounted on said cabinet and energized by actuation of said first and second DC contactors.

12. A metal joining control system as in claim 9 together with an additional outlet for auxiliary equipment.

13. A metal joining control system as in claim 2 wherein said remote control console comprises a cabinet, a control outlet mounted on said cabinet for providing connection to said grid console, a polarity switch connected to said outlet for selecting positive or negative DC output from said grid console, current control means connected to said control outlet operating to control magnitude of DC current from said grid console for said discrete welding operations, and an adjustable energy regulator configured to control total heater power consumption.

14. A metal joining control system as in claim 13 together with a high frequency unit for tungsten inert gas welding connected to said remote control console, and a normally closed electrically actuated switch in series with said polarity switch energized by connecting said high frequency unit to said remote control console whereby said polarity switch is deenergized.

15. A metal joining control system as in claim 14 together with a tungsten inert gas welding probe and a normally open probe actuating switch and wherein said normally closed electrically actuated switch is deenergized by actuation of said normally open probe actuating switch whereby said polarity switch is energized.

16. A metal joining control system as in claim 13 wherein said current control means comprises a multi-pole fine step current control connected to said control outlet, a multi-pole coarse step current control connected to said control outlet, and a fine infinitely variable current control having a range greater than the basic increment of the fine step control connected to said control outlet.

17. A metal joining control system as in claim 13 wherein said energy regulator includes a thermocouple mounted on said work piece heater, and control means for selecting a temperature at which the metal article is to be stabilized, said thermocouple operating as a feedback element in a closed control loop about said work piece heater.

18. A heating control system of the type used when joining metal articles at construction sites requiring simultaneous discrete heating operations at a plurality of widely dispersed locations utilizing AC and dual polarity DC power, means for distributing said AC and DC power to said widely dispersed locations, and outlet means for terminating said AC and DC power at said widely dispersed locations, comprising at least one work piece heater for mounting on said metal articles to be joined, a plurality of contactors receiving power from said outlet means and connected to said workpiece heater, a programmed stress relief console connected to said outlet means and to said contactor for controlling power delivered by said contactor to said heater, and a temperature sensor mounted on said work piece heater for producing a signal proportional to temperature, said signal connected to said programmed stress relief console.

19. A heating control system as in claim 18 wherein said programmed stress relief console comprises a cabinet, a power input receptacle for receiving power from said outlet means, a program switch, first and second output signal terminals, first and second heater control circuits connected between said program switch and said first and second output terminals, a control module connected between said power input receptacle and said program switch, first and second temperature sensor signal input terminals connected to said program switch, a scanner motor to drive said program switch, and a single-dual heater control switch operating to energise said scanner motor to drive said program switch to continuously direct said first temperature input to said control module for providing a control signal to said first output signal terminals when in the single heater control position, and operating tO energize said scanner motor to drive said program switch to alternately direct said first and second temperature sensor inputs to said control module for providing alternate control signals to said first and second output signal terminals when in the dual heater control position.

20. A heating control system as in claim 18 together with a grid console for containing said AC and DC contactors including at least one positive DC contactor and at least one negative DC contactor, said grid console comprising a cabinet, input terminals on said cabinet for receiving AC and DC power from said outlet means, an auxiliary stress relief output connector mounted on said cabinet, a preheat and postheat output connector mounted on said cabinet, a control input connector mounted on said cabinet, and interlock means between said positive and negative DC contactors for opening one DC contactor actuating circuit when the other is energized.

21. A metal joining control system as in claim 1 together with at least one workpiece heater connected to said grid console for mounting on said metal articles to be joined, temperature sensing means in said workpiece heater providing a signal proportional to temperature, a programmed stress relief console powered by said remote control console for receiving said signal proportional to temperature and comparing it to a signal proportional to a selected temperature, wherein said remote control console includes a switch for transferring workpiece heater control to said programmed stress relief console, and an output signal from said programmed stress relief console serving to interrupt power to the heater when said comparison indicates heater temperature is above the selected temperature and to continue power to the heater when said comparison indicates heater temperature is below the selected temperature, said programmed stress relief console output connected to said remote control console.

22. A metal joining control system as in claim 21 wherein said programmed stress relief console comprises a cabinet; an AC power receptacle mounted on said cabinet for receiving power from said remote control console; an outlet connector mounted on said cabinet for connecting said output signal to said remote control console; a heater control circuit in said cabinet connected between said AC power receptacle and outlet connector; a control module in said heater control circuit for providing said comparison and for forming said output signal in accordance with said comparison; a selector switch for selecting increasing, decreasing and constant level temperature control by said control module; and a percent-timer motor for dividing said rates of increase and decrease of temperature.

23. A metal joining control system as in claim 22 together with an additional workpiece heater connected to said grid, an additional temperature sensor in said additional heater providing an additional signal proportional to temperature, an additional output signal from said programmed stress relief console, an additional outlet connector for connecting said additional output signal to said remote control console, an additional heater control circuit connected to said additional outlet connector, a program switch for alternately connecting said signal and additional signal proportional to temperature to said control module and said comparison to said heater control and additional heater control circuits respectively for forming said additional output signal, a scanner motor for driving said program switch, and an additional selector switch for selecting programmed operation of said heater control and additional heater control circuits whereby concurrent dual heating and control is provided.

24. A programmed stress relief console for use in controlling temperature and change in temperature of articles being heated, comprising a cabinet, a power input receptacle, a program switch, first and second output signal terminals, first and second heater control circuits connected between said program switch and said first and second output terminals, a control module connected between said power input receptacle and said program switch, first and second temperature sensor input terminals connected to said program switch, a scanner motor to drive said program switch and a single/dual heater control switch operating to energize said scanner motor to drive said program switch to continuously direct said first temp sensor input to said control module for providing a control signal to said first output signal terminals when in the single heater control position, and operating to energize said scanner motor to drive said program switch to alternately direct said first and second temp sensor inputs to said control module for providing alternate control signals to said first and second output signal terminals when in the dual heater control position.

25. An automatic grid console for use in distributing power in accordance with external control signals, comprising a cabinet; AC and dual polarity DC power input terminals; an AC power outlet, first, second and third DC power outlets; a first DC contactor connected between one polarity DC power input and said first DC power outlet; a second DC contactor connected between the other polarity DC power input and said first DC power outlet; a third DC contactor connected between the other polarity DC power input and said second DC power outlet; first, second, and third electrical actuators for rendering respective contactors responsive to external control signals; a network of grid resistance elements having one side connected in common to said third DC power outlet; a plurality of grid element switches each having one side connected in common to said first DC outlet and the other side connected to one grid resistance element in said network; a plurality of grid element switch electrical actuators for rendering said switches responsive to remote control signals; said contactor and grid element switch actuators operating to provide a selected polarity DC voltage at said first outlet, said other DC polarity voltage at said second outlet, and to meter current of a selected polarity through said third DC power outlet.

26. An automatic grid console as in claim 25 together with interlock means between said first and second contactors for opening one of said first and second contactor actuating circuits when the other is remotely selected.

27. A remote control console for use in generating signals for controlling circuits which distribute power for use in heating and welding operations comprising a cabinet, means for receiving input power, a DC polarity switch energized by said input power, a heater control circuit energized by said input power, means for generating current control signals energized by said input power, an adjustable energy regulator for interrupting power to said heater control circuit, and control outlet means mounted on said cabinet for connecting said D.C. polarity switch, heater control circuit, current control signal, and energy regulator to said circuits to be controlled.

* * * * *